(12) United States Patent
Hori

(10) Patent No.: US 7,595,813 B2
(45) Date of Patent: Sep. 29, 2009

(54) IMAGE FORMING APPARATUS

(75) Inventor: Kazuto Hori, Daito (JP)

(73) Assignee: Funai Electric Co., Ltd., Daito-shi (JP)

( * ) Notice: Subject to any disclaimer, the term of this patent is extended or adjusted under 35 U.S.C. 154(b) by 24 days.

(21) Appl. No.: 11/713,001

(22) Filed: Mar. 2, 2007

(65) Prior Publication Data
US 2007/0211136 A1 Sep. 13, 2007

(30) Foreign Application Priority Data
Mar. 9, 2006 (JP) .............................. 2006-063824

(51) Int. Cl.
B41J 2/385 (2006.01)
B41J 2/41 (2006.01)
B41J 27/00 (2006.01)
B41J 2/435 (2006.01)

(52) U.S. Cl. ..................... 347/263; 347/138; 347/152; 347/257

(58) Field of Classification Search .................. 359/196
See application file for complete search history.

(56) References Cited

U.S. PATENT DOCUMENTS 6,243,128 B1 * 6/2001 Yamakawa .................. 347/263
6,281,918 B1 * 8/2001 Burdick et al. .............. 347/116

FOREIGN PATENT DOCUMENTS

| JP | 60-107971 A | | 6/1985 |
|---|---|---|---|
| JP | 3-75720 A | | 3/1991 |
| JP | 03075720 A | * | 3/1991 |
| JP | 8-11348 A | | 1/1996 |
| JP | 10-13633 A | | 1/1998 |
| JP | 11-194281 A | | 7/1999 |
| JP | 2000-249953 A | | 9/2000 |
| JP | 2000249953 A | * | 9/2000 |
| JP | 2001-125026 A | | 5/2001 |
| JP | 2006-123478 A | | 5/2006 |

OTHER PUBLICATIONS

Short Run Pro, LLC (product UBRKT-11CRS-4308-53310 at www.shortrunpro.com).*

* cited by examiner

Primary Examiner—Matthew Luu
Assistant Examiner—Kendrick X Liu
(74) Attorney, Agent, or Firm—Crowell & Moring LLP

(57) ABSTRACT

In an image forming apparatus (1) utilizing electrophotographic technology, position and posture of a laser scan unit (5) with respect top a frame (13) is adjusted easily without cost rise and upsizing of the apparatus. Semicircular recesses (53) and an elongate hole (54) are formed at each of three fixing portions (52a, 52b and 52c) in the vicinities of side faces (51b) and a rear face (51c) of a housing (51) of the laser scan unit (5), and an adjuster 30 serving as a spacer is attached to each of the fixing portions (52a, 52b and 52c). Each adjuster (30) is elected among a plurality of kinds of adjustors respectively having different thicknesses manufactured by press working of metal plates commercially produced and having different thicknesses with using the same dies. The adjustor has a pair of semicircular engaging portions 30b and a coupling portion 30a perpendicular to and coupling the engaging portions (30b).

4 Claims, 8 Drawing Sheets

IMAGE FORMING APPARATUS

BACKGROUND OF THE INVENTION

1. Field of the Invention

The present invention relates to an image forming apparatus comprising, a laser scan unit that forms a latent image on a surface of a photoconductor drum by irradiating laser beams while scanning.

2. Description of the Related Art

In a conventional image forming apparatus such as a laser beam printer that utilizes electrophotographic technology, an optical system for scanning laser beams is unitized as a laser scan unit in consideration of workability of assembly or easiness of maintenance. Such a laser scan unit is previously adjusted to have a predetermined quality when components thereof are assembled as a unit. Thus, it is no need to adjust the laser scan unit after the assembly, so that it can be handled as a component, that is, a black box.

As for the attachment of the laser scan unit on the image forming apparatus, the laser scan unit is generally fixed on a metal frame provided inside the image forming apparatus by screws. In addition, it is necessary to adjust the position and posture of the laser scan unit so that a main scanning direction of the laser beam by the laser scan unit becomes perpendicular to a sub-scanning direction (paper feed direction) of a paper sheet by a paper feed mechanism when the laser scan unit is fixed on the frame of the e image forming apparatus. Therefore, various arts are conventionally proposed with respect to installation positioning control of the laser scan unit.

Japanese Laid-Open Patent Publication No. 8-11348 discloses a conventional image forming apparatus that a wedge shaped member is provided between a laser scan unit and a frame of an image forming apparatus. The laser scan unit is fixed on a plane of the wedge shaped member and the wedge shaped member with the laser scan unit is rotatable fixed on the frame around a predetermined rotation axis, so that a main scanning direction of laser beam by the laser scanning unit can be adjusted minutely. The wedge shaped member, however, becomes larger than the laser scan unit, so that it causes upsizing of the image forming apparatus. Furthermore, the wedge shaped member is necessary to be finished to a predetermined quality, so that it causes the cost rise.

Japanese Laid-Open Patent Publication No. 2000-249953 discloses a conventional image forming apparatus that four corners of a laser scan unit is fixed on a frame of an image forming apparatus, and a wedge shaped spacer is slidably provided between the laser scan unit and the frame at one corner. Inclination of the laser scan unit with respect to the frame can be adjusted by moving the spacer. It, however, needs a space to provide the spacer slidably, so that it is difficult to downsize the image forming apparatus. Furthermore, the insertion of the spacer between the laser scan unit and the frame causes the deformation of a housing of the laser scan unit.

Japanese Laid-Open Patent Publication No. 2001-125026 discloses a conventional image forming apparatus that comprises an angle adjuster of a light source in an optical system for scanning laser beam. Such a configuration, however, needs angle adjustment of the light source after attachment of the optical system for scanning laser beam on the image forming apparatus, so that it is impossible to unitize the optical system for scanning laser beam as a laser scan unit that needs no adjustment.

SUMMARY OF THE INVENTION

A purpose of the present invention is to provide an image forming apparatus that enables to control position and posture of a laser scan unit which is unitized as a black box easily and quickly when the laser scan unit is fixed on a frame, while preventing the cost rise and upsizing of the apparatus.

An image forming apparatus utilizing electrophotographic technology in accordance with an aspect of the present invention comprises a laser scan unit which is previously adjusted to have a predetermined quality when components thereof are assembled as a unit, and can be treated as a black box after being assembled with no adjustment. The laser scan unit is fixed on a frame by screws at three fixing portions respectively provided in vicinities of different three faces among a front face, a rear face and side faces of a housing of the laser scan unit made of resin molding, so as to be rotated in a horizontal plane around a vertical rotation axis. An adjuster, which can serve as a spacer to adjust inclination of the laser scan unit with respect to the frame in a vertical plane, is attached to each of the three fixing portions of the laser scan unit. The adjuster is selected among plurality kinds of adjusters each of which is formed of metal plate having different thickness.

According to such a configuration, the position and posture, especially, the inclination of the laser scan unit with respect to the frame in a vertical plane or vertical planes including the main scanning direction and/or sub-scanning direction can be adjusted by a simple method to select the thickness of the adjuster attached to each of the three fixing portions of the housing of the laser scan unit. Consequently, the position and posture of the laser scan unit with respect to the frame is precisely adjusted easily, so that quality of an image formed on a recording paper sheet can be increased.

Furthermore, the metal plates commercially produced have various thicknesses so that the thickness becomes thicker, for example, by 0.1 mm, and the thickness accuracies of them are high at all. Therefore, various kinds of the adjusters can be made with using the same dies by changing the thicknesses of the metal plates as a material of the adjusters, so that the cost for forming the dies can be reduced. Consequently, the cost for forming each adjuster becomes inexpensive.

While the novel features of the present invention are set forth in the appended claims, the present invention will be better understood from the following detailed description taken in conjunction with the drawings.

BRIEF DESCRIPTION OF THE DRAWINGS

The present invention will be described hereinafter with reference to the annexed drawings. It is to be noted that all the drawings are shown for the purpose of illustrating the technical concept of the present invention or embodiments thereof, wherein.

DETAILED DESCRIPTION OF THE EMBODIMENT

Figure 1:
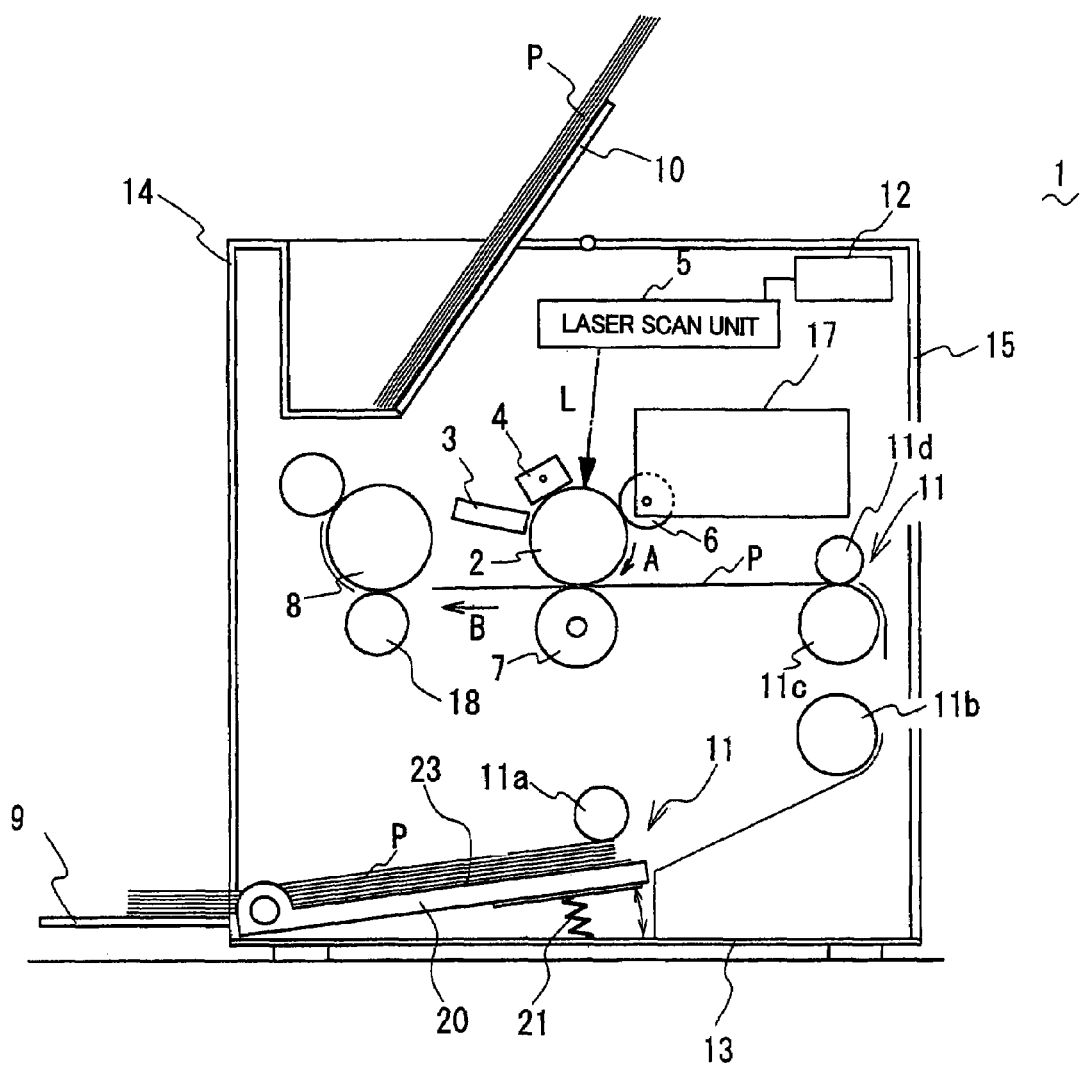
FIG. 1 is a sectional view showing a configuration of a laser beam printer which is an example of an image forming apparatus in accordance with an embodiment of the present invention.

An image forming apparatus in accordance with an embodiment of the present invention is described with reference to the figures. FIG. 1 shows a configuration of a laser beam printer which is an example of the image forming apparatus 1.

The image forming apparatus 1 comprises: a photoconductor drum 2 that has a photoconductor layer formed on a surface thereof; a cleaner 3 that removes remained toner particles from the surface of the photoconductor drum 2; a charger 4 that charges the surface of the photoconductor layer evenly; a laser scan unit 5 that irradiates laser beams on the surface of the photoconductor drum 2 while scanning so as to form a latent image; a developer (developing brush) 6 that develops the latent image on the surface of the photoconductive drum 2 by adhering toner particles; a transfer roller 7 that transfers developed toner image to a recording paper sheet; a fuser/fixer 8 that fuses the toner particles and fixes the toner image on the recording paper sheet; and a main controller 12 that controls the image forming apparatus 1 entirely. The cleaner 3, the charger 4, the developer 6 and the transfer roller 7 are arranged in this order along a rotation direction of the photoconductor drum 2 shown by arrow A. An exposing area where the laser scan unit 5 scans the laser beams is disposed between the charger 4 and the developer 6. The fuser/fixer 8 is located at a position downstream from the transfer roller 7 in a paper feed path shown by arrow B.

A paper feed tray 9 on which recording paper sheets p are disposed is provided in a front bottom portion of a housing 14. An exit tray 10 to which printed recording paper sheets are exited is provided in a front upper portion of the housing 14. In addition, a metal frame 13 is provided in the housing 14 so that the above mentioned elements are installed on the frame 13. A paper feed mechanism 11 is further installed on the frame 13. The paper feed path for conveying the recording paper sheet p one by one is formed like S-shape in the housing 14. The housing 14 has a door member 15 in an upper rear portion so that a toner cartridge 17 including the developer 6 can be interchanged or a recording paper sheet which is jammed in the paper feed path can be removed through an opening of the housing 14 when the door member 15 is opened.

The laser scan unit 5 has a laser diode to which a light emitting voltage is applied through an electric power supply (not shown). The transfer roller 7 is provided to face the surface of the photoconductor drum 2 so as to press a recording paper sheet P to the surface of the photoconductor drum 2 while charging the surface of the recording paper sheet P. A predetermined transfer voltage for charging the surface of the recording paper sheet P is applied to the transfer roller 7 through the electric power supply. The fuser/fixer 8 is a roller having a built-in heater such as a halogen lamp to generate heat. A pressure roller 18 facing a surface of the fuser/fixer 8 is further provided to nip the recording paper sheet P on which the toner image is transferred between the fuser/fixer 8 and the pressure roller 18. Heat and pressure are applied to the recording paper sheet P while it is nipped between the fuser/fixer 8 and the pressure roller 18, so that the toner particles forming the toner image are melted and adhered on the surface of the recording paper sheet P. A predetermined fixing voltage is applied to the built-in heater of the fuser/fixer 8 through the electric power supply.

The paper feed mechanism 11 is comprised of: a movable tray 20 which is provided in an inside of the housing 14 and adjoins to the paper feed tray 9 so as to form a paper mounting face 23; a pickup roller 11a which is disposed to face a front end of the movable tray 20, picks up a recording paper sheet P one by one mounted on the paper mounting face 23 and conveys the recording paper sheet P into the inside of the housing 14; conveyance rollers 11b, 11c and 11d which convey the recording paper sheet P along the paper feed path; and a coil spring 21 which forces up the movable tray 20 upwardly toward the pickup roller 11a.

Figure 2:
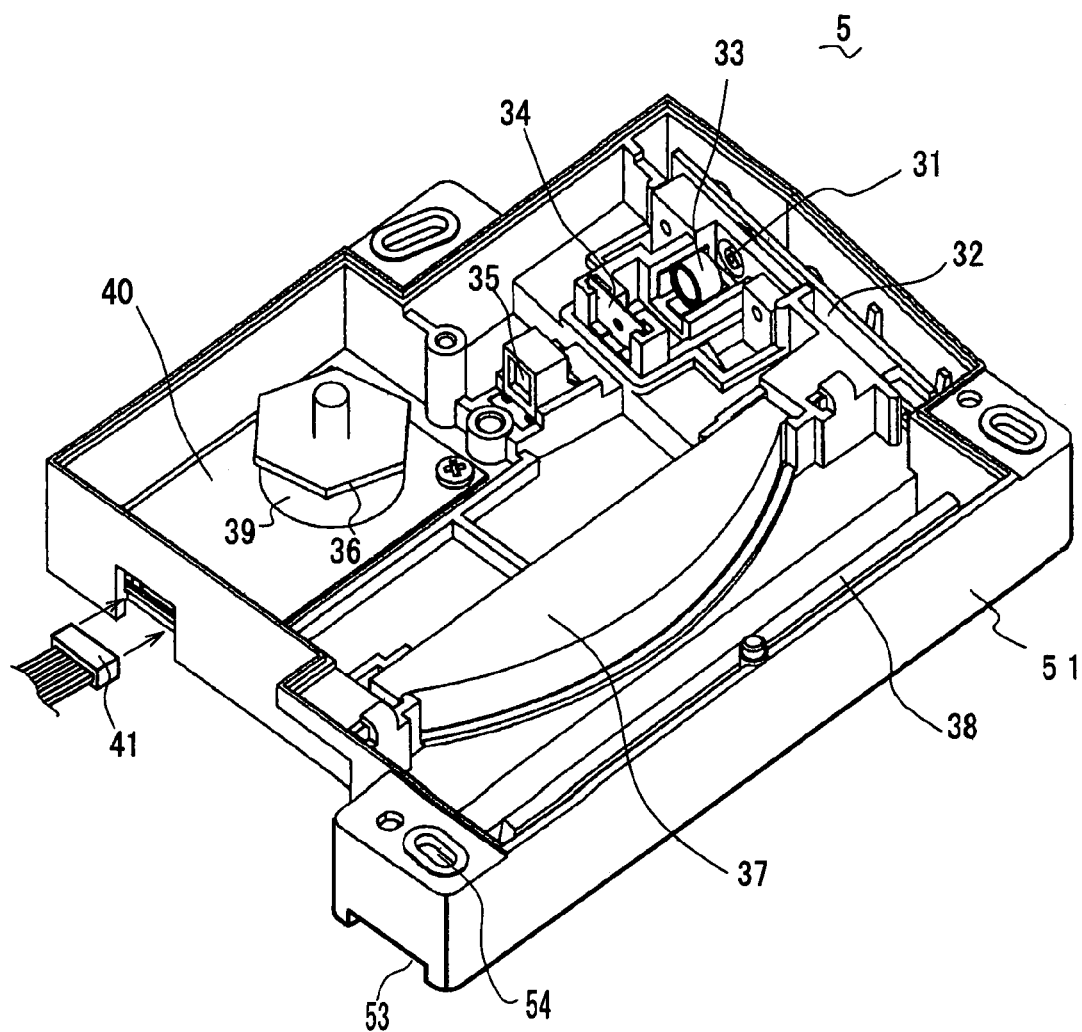
FIG. 2 is a perspective view showing a configuration of a laser scan unit in the image forming apparatus mentioned above.

FIG. 2 shows a configuration of the laser scan unit 5. The laser scan unit 5 is comprised of: a laser diode 31 which emits a laser beam; a first circuit board 32 which applies a driving voltage to the laser diode 31; a collimator lens 33 which collimates the laser beam emitted from the laser diode 31; a slit 34 which restricts a diameter of the laser beam passing therethrough; a cylindrical lens 35 which converges the laser beam passed through the slit 34 only in the main scanning direction; a polygon mirror 36 which reflects the laser beam converged by the cylindrical lens 35 in the main scanning direction; an fθ lens 37 which corrects aberration of the laser beam reflected by the polygon mirror 36 while the laser beam passes therethrough; a mirror 38 which reflects the laser beam passes through the fθ lens toward the surface of the photoconductor drum 2; a second circuit board 40 on which a driving motor 39 for rotating the polygon mirror 36 is mounted; a connector 41 which connects the second circuit board 40 to the main controller 12; and a boxy housing 51 into which the above mentioned elements are installed.

Figure 3:
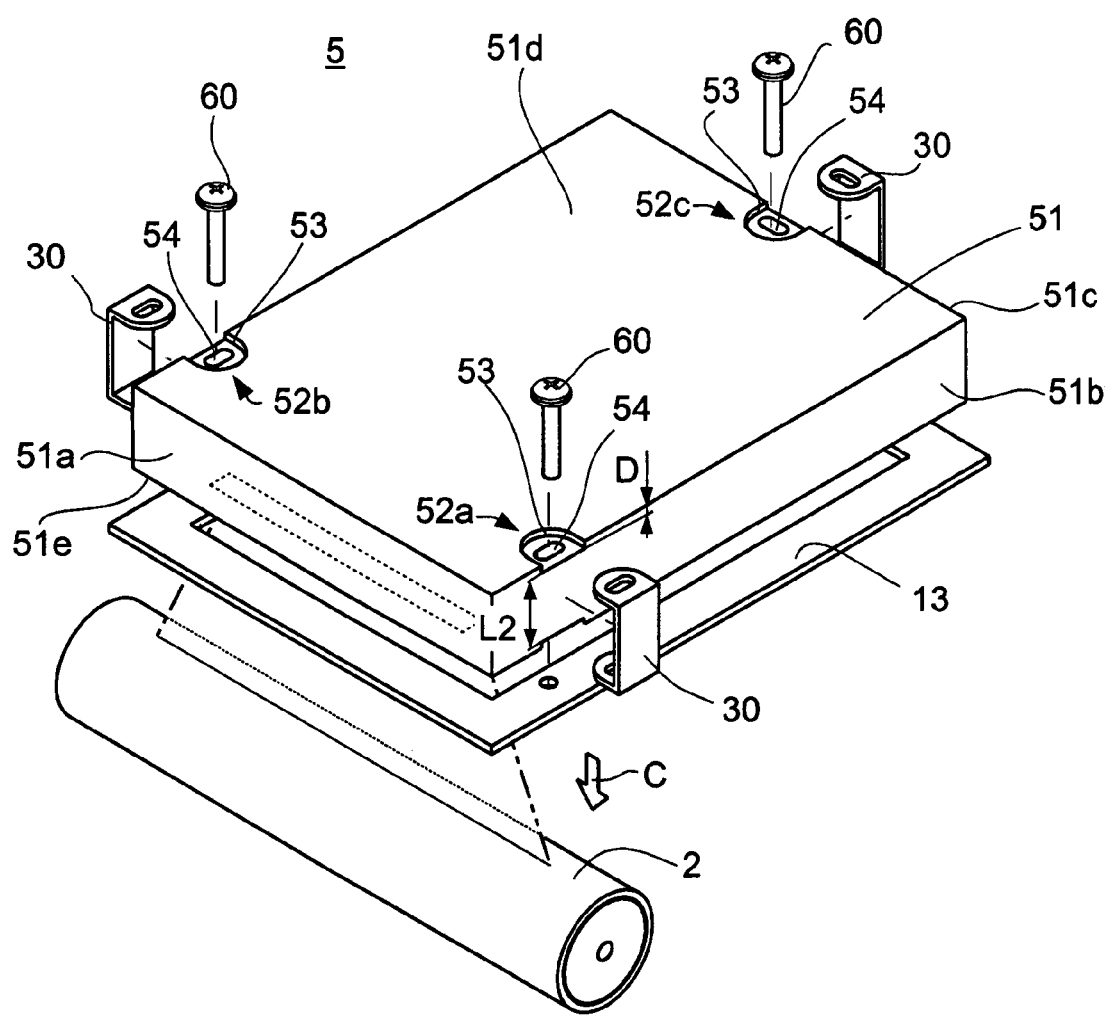
FIG. 3 is a perspective view showing a configuration of mounting structure to mount the laser scan unit on a frame in the image forming apparatus mentioned above.

FIG. 3 shows a configuration of a mounting structure for mounting the laser scan unit 5 on the frame 13. The laser scan unit 5 is fixed on the frame 13 by screws 60 at three points including two points in the vicinities of both side faces 51b and one point in the vicinity of a rear face 51c of the housing 51. Fixing portions 52a, 52b and 52c are respectively formed on the housing 51 in the vicinities of both side faces 51b and in the vicinity of the rear face 51c. The housing 51 is, for example, made of a resin material by molding. Each of the fixing portions 52a, 52b and 52c is configured by a pair of semicircular recesses 53 formed on both of a top face 51d and a bottom face 51e, and a first elongate hole 54 which penetrates the housing 51. An adjuster 30 is attached to each of the fixing portions 52a, 52b and 52c.

Figure 4:
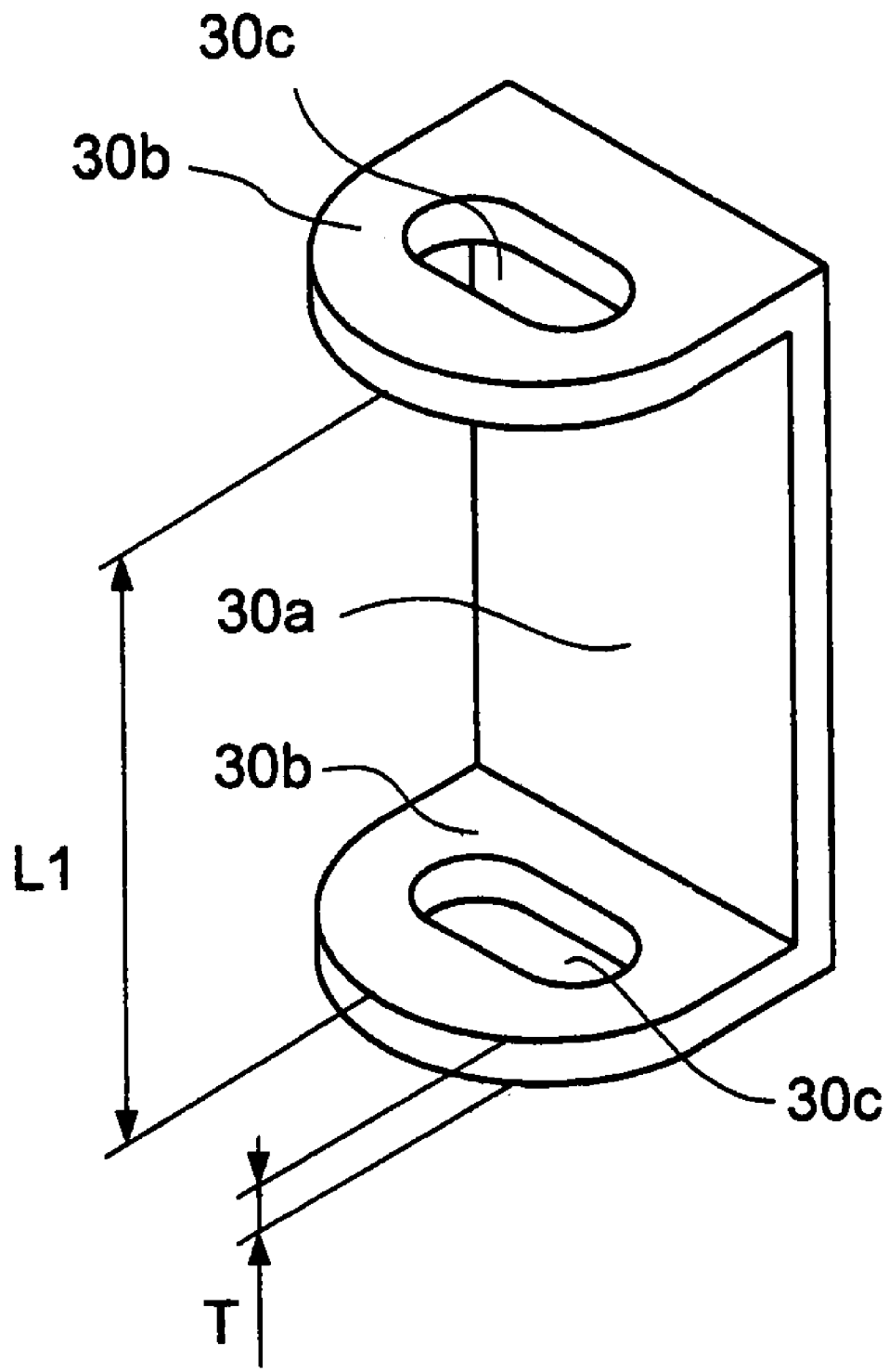
FIG. 4 is a perspective view showing an appearance of an adjuster used to adjust position and posture of the laser scan unit in the image forming apparatus.

FIG. 4 shows an appearance of the adjuster 30. The adjuster 30 has a coupling portion 30a which faces or contacts to the side face 51b or the rear face 51c of the housing 51, and a pair of engaging portions 30b which are engaged with the recesses 53 of each of the fixing portions 52a, 52b and 52c. The coupling portion 30a is perpendicular to both of the engaging portions 30b. The engaging portion 30b has substantially the same semicircular shape as the recess 53 and dimensions of the engaging portion 30b are substantially the same as but a little smaller by predetermined tolerances than those of the recess 53. An inner dimension L1 between the engaging portions 30b is substantially the same as but a little larger by a predetermined tolerance than a dimension L2 between the semicircular recesses 53 formed on the top face 51d and the rear face 51e in each of the fixing portions 52a, 52b and 52c. A second elongate hole 30c having substantially the same shape and the same dimensions as those of the first elongate hole 54 is formed on each of the engaging portions 30b. According to such a configuration, the adjuster 30 can be attached to each of the fixing portions 52a, 52b and 52c. Furthermore, the recesses 53 of each of the fixing portions 52a, 52b and 52c can serve as guides, so that the adjuster 30 can easily be attached to each of the fixing portions 52a, 52b and 52c, and the center control of the first elongate hole 54 of each of the fixing portions 52a, 52b and 52c with the second elongate holes 30c of the adjuster 30 becomes easier.

The adjuster 30 is formed by press forming of a metal plate such as a plated steel plate. As is generally known, as for the metal plates commercially produced, the metal plates having various thicknesses are prepared so that the thickness becomes thicker, for example, by 0.1 mm, and the thickness accuracies of them are high at all. Therefore, when several kinds of the adjusters 30 respectively having different thicknesses are prepared by selecting the thicknesses of the materials, the adjusters 30 can serve as spacers to adjust level and or inclination of the laser scan unit 5 with respect to the frame 13 when the laser scan unit 5 is mounted on the frame 13. For serving as a spacer, it is sufficient that the inner dimension L1 between the engaging portions 30b of the adjuster 30 is accurately formed. Therefore, metal plates of various thicknesses can be pressed with using the same dies, so that the adjusters 30 of various thicknesses can be manufactured inexpensively.

In this embodiment, one adjuster 30 is attached to each of the fixing portions 52a, 52b and 52c of the housing 51 at any level. Hereupon, a depth D of the recess 53 of each of the fixing portions 52a, 52b and 52c of the housing 51 is made shallower than the thinnest thickness $T_{MIN}$ of the materials of the adjuster 30, so that the housing 51 made of resin material never contacts on the frame 13 directly. Thus, it is possible to prevent cracking of the housing when the laser scan unit 5 is mounted on the frame 13 by the screws 60.

Subsequently, adjustment of position and posture of the laser scan unit 5 with respect to the frame 13 is described. As can be seen from FIGS. 2 and 3, the laser scan unit 5 is fixed on the frame 13 at three points. In other words, the laser scan unit 5 can be rotated around a point specified by three fixing portions 52a, 52b and 52c in a horizontal plane in a scope that the screw 60 can be moved relative to the first and second elongate holes 30a and 54. On the other hand, the laser scan unit 5 can be inclined in a scope decided by combination of the thicknesses T of the adjusters 30 in a vertical plane.

Figure 5:
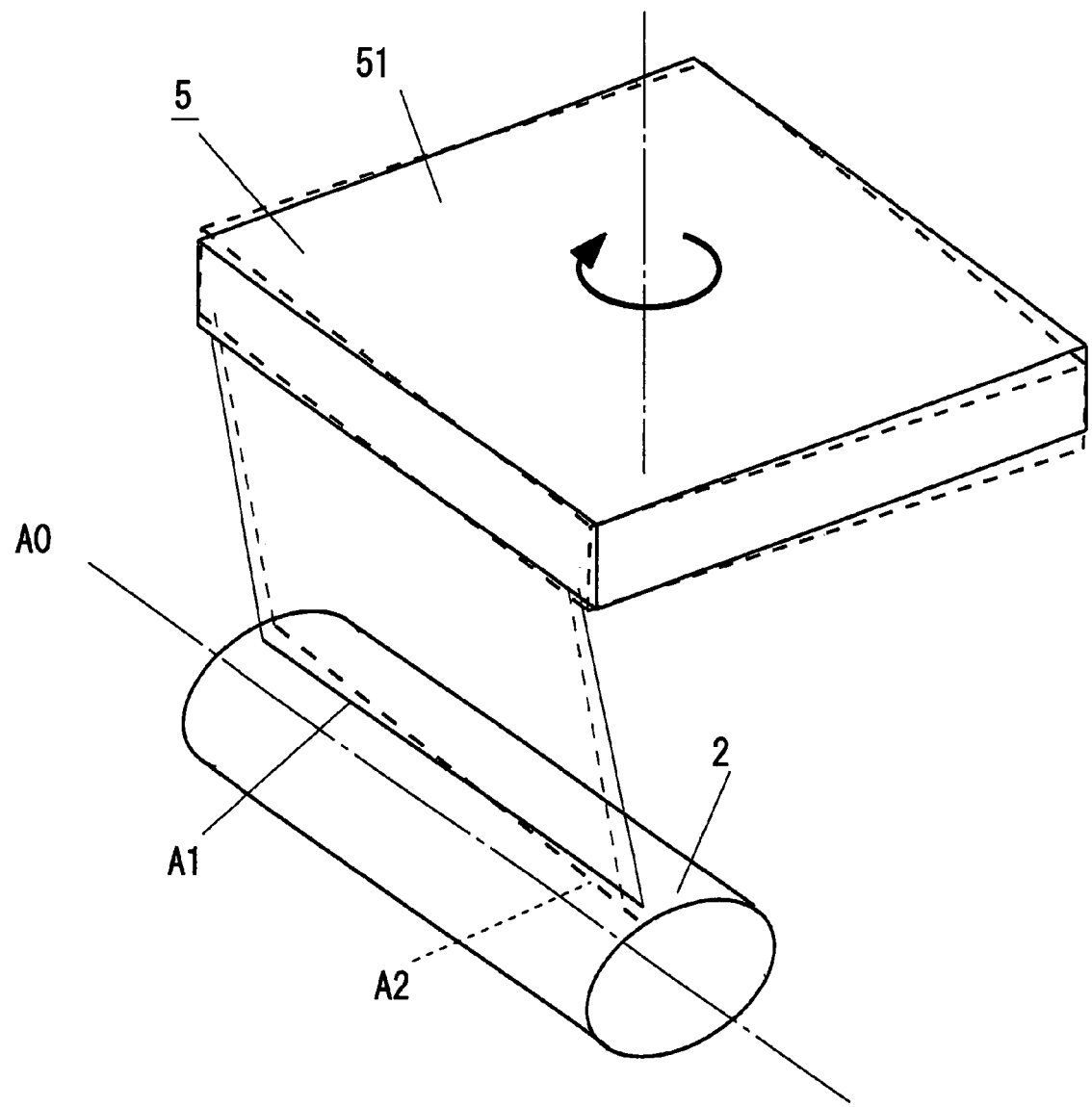
FIG. 5 is a perspective view showing a problem caused by miss-positioning of the laser scan unit with respect to the frame in a horizontal plane.
Figure 6:
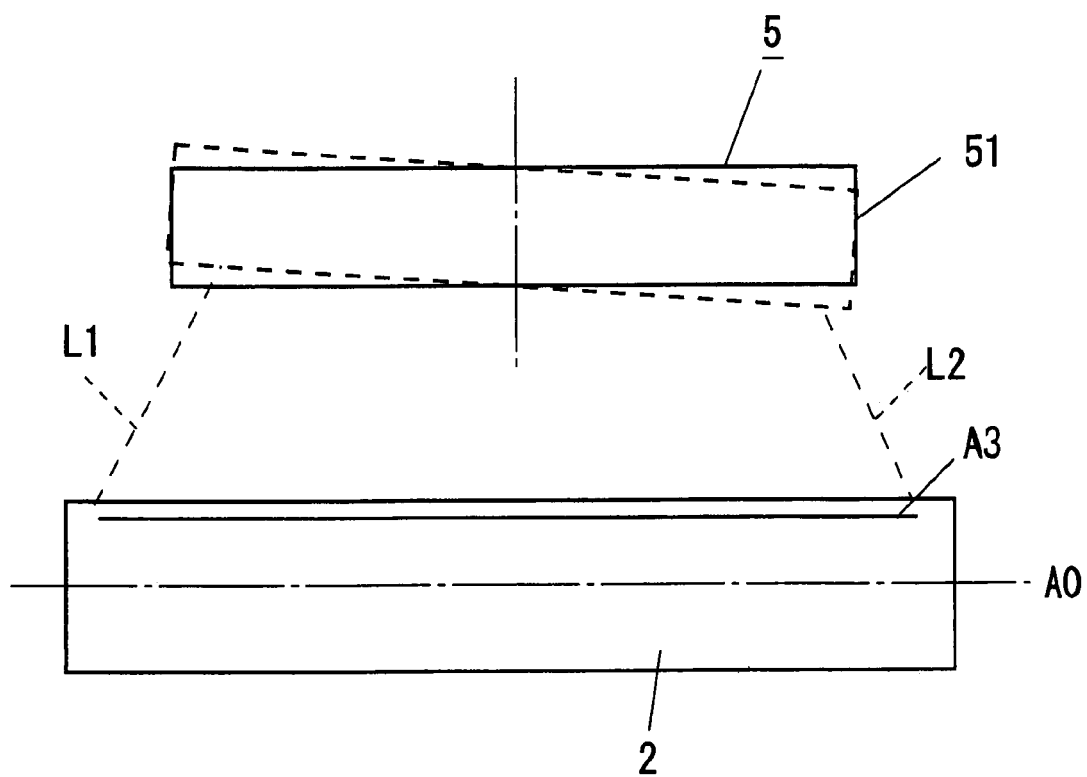
FIG. 6 is a front view showing a problem caused by miss-positioning of the laser scan unit with respect to the frame in a vertical plane including a main scanning direction.
Figure 7:
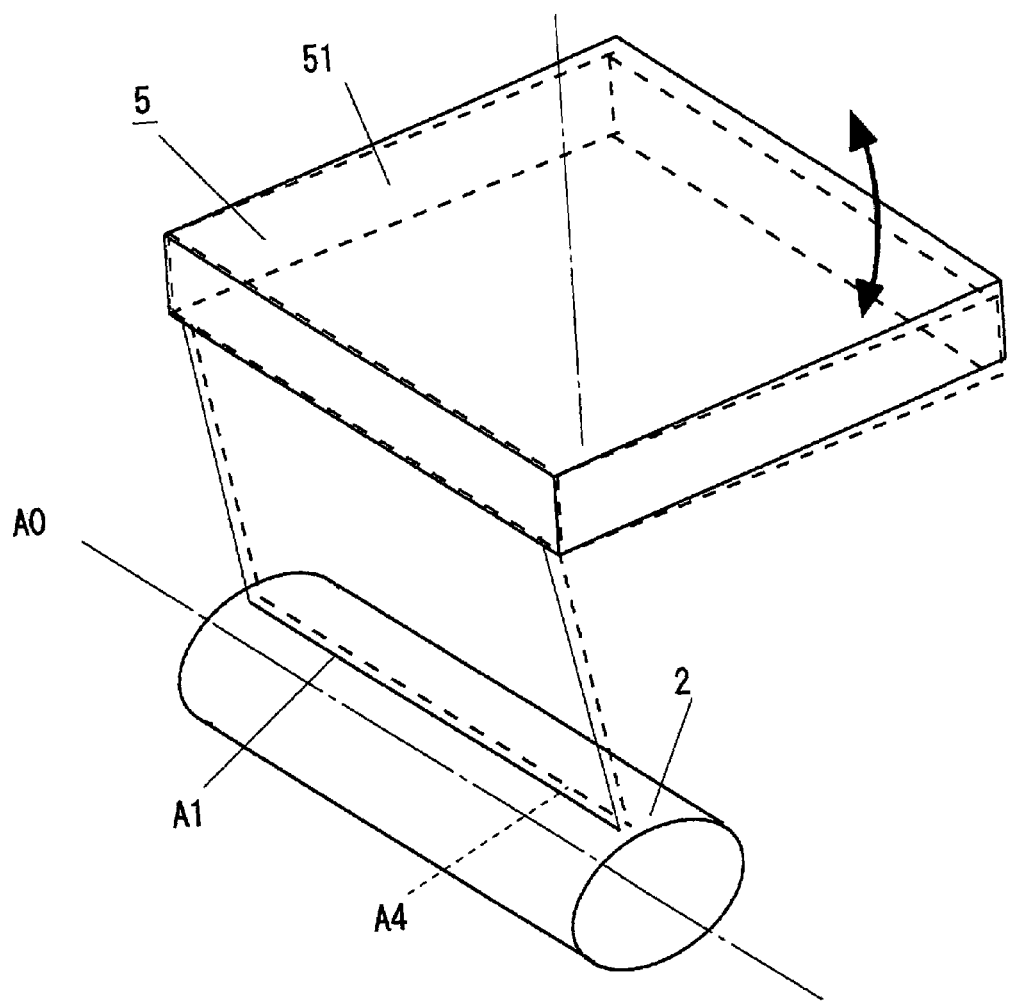
FIG. 7 is a perspective view showing a problem caused by miss-positioning of the laser scan unit with respect to the frame in a vertical plane including a sub-scanning direction.

Subsequently, problems caused by miss-positioning of the laser scan unit 5 with respect to the frame 13 are described with reference to FIGS. 5, 6 and 7. In FIGS. 5, 6 and 7, solid lines show the proper positions or postures of the laser scan unit 5 (or the housing 51) with respect to the frame 13, and dotted lines show the mismatched positions or postures of the laser scan unit 5 with respect to the frame 13. In addition, each scanning line A1 shows the proper scanning line of the laser beam which scans on the surface of the photoconductor drum 2.

When the position of the laser scan unit 5 is mismatched in the horizontal plane, the scanning line A2 of the laser beam becomes oblique with respect to a rotation axis A0 of the photoconductor drum 2, as shown in FIG. 5. Consequently, an image formed on the recording paper sheet P becomes oblique. Such a phenomenon can be eliminated by rotating the laser scan unit 5 in the horizontal plane.

When the laser scan unit 5 is inclined in the vertical plane including the main scanning direction, although the scanning line A3 of the laser beam is parallel to the rotation axis A0 of the photoconductor drum 2, the optical paths L1 and L2 of the laser beams respectively reach to both ends of the photoconductor drum 2 are different each other, as shown in FIG. 6. Thus, the diameters of the laser beams are varied, so that sizes of dots formed by the laser beams are varied, too. Consequently, quality of an image formed on the recording paper sheet P at both side portions may be deteriorated. Such a phenomenon can be eliminated by changing the thickness of the adjuster which is attached to one of the fixing portions 52a and 52b formed in the vicinity of the front face 51a and in the vicinities of the side faces 51b.

When the laser scan unit 5 is inclined in the vertical plane including the sub-scanning direction, although the scanning line A4 of the laser beam is parallel to the rotation axis A0 of the photoconductor drum 2, the scanning line A4 of the laser beam is shifted in parallel with respect to the proper scanning line A1 of the laser beam, as shown in FIG. 7. In such a case, a start position of an image formed on the recording paper sheet P may be shifted, so that a white line may appear at front end or a rear end of the recording paper sheet P. Such a phenomenon can be eliminated by changing the thickness of the adjusters which are attached to both of the fixing portions 52a and 52b formed in the vicinity of the front face 51a and in the vicinities of the side faces 51b, or by changing the thickness of the adjuster which is attached to the fixing portion 52c formed in the vicinity of the center of the rear face 51c.

According to the present invention, the position and posture of the laser scan unit 5 with respect to the frame 13 can be adjusted by a simple method of attaching the adjusters 30 to the fixing portions 52a, 52b and 52c of the housing 51 which are selected among a plurality kinds of the adjusters 30 respectively having different thicknesses. The adjusters 30 respectively having different thicknesses can be manufactured by press working of metal plates commercially produced and having different thicknesses with using the same dies, so that cost for forming the dies can be reduced.

Figure 8:
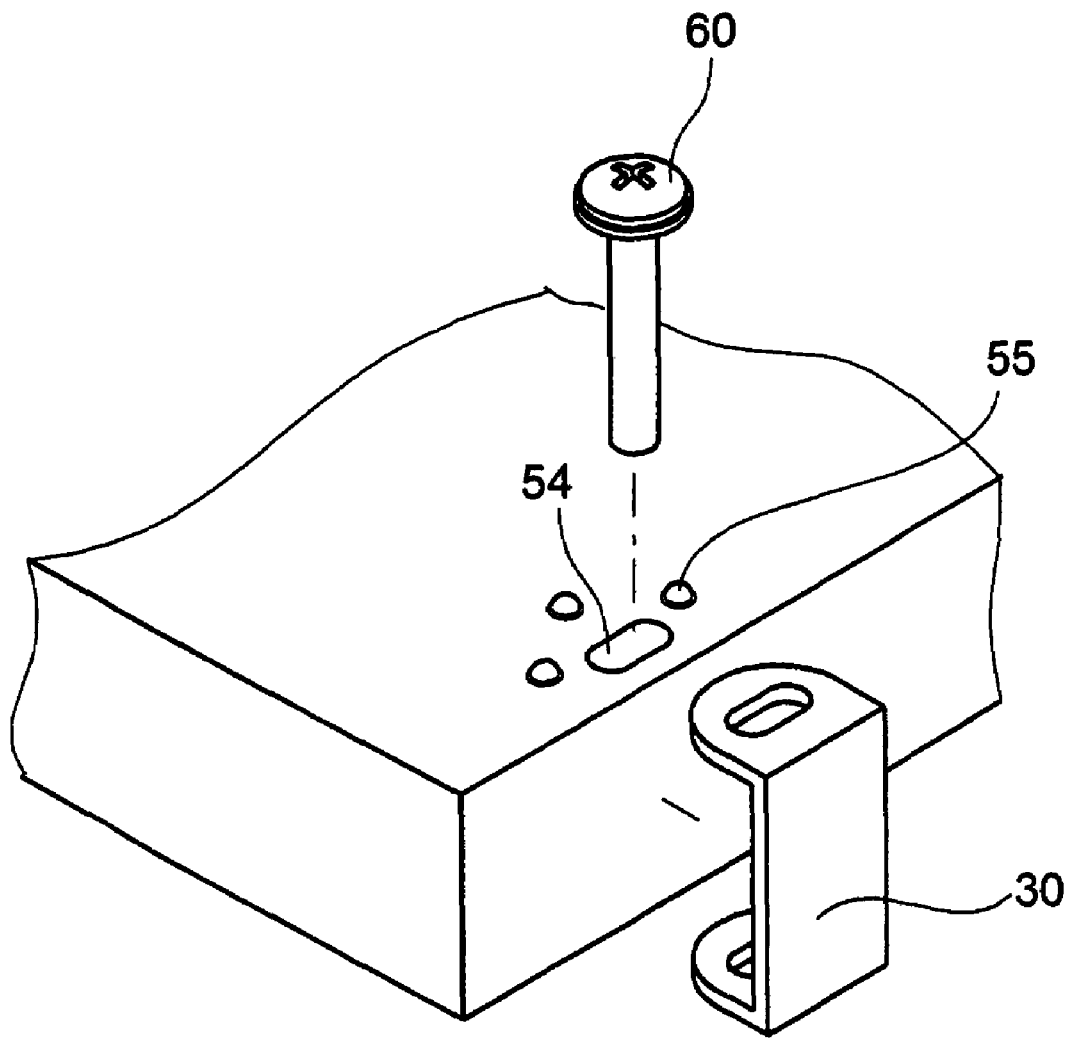
FIG. 8 is a perspective view showing a modified configuration of the mounting structure to mount the laser scan unit on the frame in the image forming apparatus mentioned above.

In addition, the present invention is not limited to the above mentioned configuration of the embodiment, and it can be applied various modifications. Although the semicircular recesses 53 are formed on both of the top face 51d and the bottom face 51e of the housing 51 in the above mentioned embodiment, the recess 53 may be formed on one of the top face 51d and the bottom face 51e of the housing 51, thereby enabling to have the same effects. Alternatively, instead of forming the semicircular recesses 53, a plurality of protrusions 55, which are to be engaged with the engaging portion 30b of the adjuster 30, may be formed on one of or both of the top face 51d and the bottom face 51e of the housing 51, as shown in FIG. 8. Furthermore, the shapes of the engaging portion 30b of the adjuster 30 and the recesses 53 are not be limited to the semicircular shape, and they may be other shapes such as a quadrangle, or the like.

In summary, the image forming apparatus utilizing electrophotographic technology in accordance with the present invention comprises a laser scan unit which is previously adjusted to have a predetermined quality when components thereof are assembled as a unit, and can be treated as a black box after being assembled with no adjustment. The laser scan unit is fixed on a frame by screws at three fixing portions respectively provided in vicinities of different three faces among a front face, a rear face and side faces of a housing of the laser scan unit made of resin molding, so as to be rotated in a horizontal plane around a vertical rotation axis. An adjuster, which can serve as a spacer to adjust inclination of the laser scan unit with respect to the frame in a vertical plane, is attached to each of the three fixing portions of the laser scan unit. The adjuster is selected among plurality kinds of adjusters each of which is formed of metal plate having different thickness.

In the above mentioned configuration, it is preferable that each of the three fixing portions has at least one guide which is formed on at least one of a top face and a bottom face of the housing of the laser scan unit, and the adjuster has a coupling portion which faces or contacts to one of the front face, the rear face and the side faces of the housing of the laser scan unit, and a pair of engaging portions which are formed at both ends of the coupling portion to protrude in same direction and at least one of which engages with the guide of each of the three fixing portions.

Furthermore, it is preferable that an inner dimension between the engaging portions of the adjuster has a predetermined value with no relation to the thickness of the metal plates of the adjuster.

Still furthermore, it is preferable that a first elongate hole which penetrates through the housing from the top face to the bottom face is formed at each of the three fixing portions, and a second elongate hole having substantially same shape as the first elongate hole is formed at each of the engaging portions of the adjuster, so that the screw penetrates through the first and second elongate holes when the laser scan unit is mounted on the frame.

Still furthermore, it is preferable that the guide is a recess formed on the top face or the bottom face of the housing of the laser scan unit, the engaging portions of the adjuster have substantially same shape of the recess, and a depth of the guide is shallower than a smallest thickness of the metal plate of the adjusters, so that the bottom face of the housing of the laser scan unit never contacts with the frame.

Alternatively, it is preferable that the guide is at least one protrusion formed on the top face or the bottom face of the housing of the laser scan unit, and the protrusion contacts with at least one sides of the engaging portions of the adjuster, so that the bottom face of the housing of the laser scan unit never contacts with the frame.

This application is based on Japanese patent application 2006-063824 filed Mar. 9, 2006 in Japan, the contents of which are hereby incorporated by references.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. An image forming apparatus utilizing electrophotographic technology, comprising:
   a laser scan unit which is previously adjusted to have a predetermined quality when components thereof are assembled as a unit, the laser scan unit configured as a black box after being assembled with no adjustment, wherein the laser scan unit is fixed on a frame by screws at three fixing portions respectively provided in vicinities of different three faces among a front face, a rear face and side faces of a housing of the laser scan unit made of resin molding, so as to be rotated in a horizontal plane around a vertical rotation axis;
   at least one adjuster which serves as a spacer to adjust inclination of the laser scan unit with respect to the frame in a vertical plane, wherein the at least one adjuster is attached to a corresponding one of the three fixing portions of the laser scan unit and wherein the at least one adjustor has a coupling portion which faces or contacts one of the front face, the rear face and the side faces of the housing of the laser scan unit, and a pair of engaging portions which are formed at both ends of the coupling portion to protrude perpendicular to the coupling portion in a same direction; and
   wherein the at least one adjuster is selected from among a plurality of adjusters each of which is formed of a metal plate having a different even thickness,
   and wherein each of the three fixing portions has a pair of recesses formed on at least one of a top face and a bottom face of the housing of the laser scan unit, wherein a depth of each of the recess is made shallower than a smallest thickness of the metal plate of the at least one adjuster, and the pair of recesses engage the engaging portions of the corresponding adjuster.

2. The image forming apparatus in accordance with claim 1, wherein
   an inner dimension between the engaging portions of the at least one adjuster has a predetermined value with no relation to the thickness of the metal plates of the at least one adjuster.

3. The image forming apparatus in accordance with claim 1, wherein
   a first elongated hole which penetrates through the housing from the top face to the bottom face is formed at each of the three fixing portions; and
   a second elongated hole having substantially same shape as the first elongate hole is formed at each of the engaging portions of the at least one adjuster, so that the screw penetrates through the first and second elongated holes when the laser scan unit is mounted on the frame.

4. An image forming apparatus comprising:
   a photoconductor drum having a photoconductive layer formed on a surface thereof;
   an exposing means that irradiates laser beams on the surface of the photoconductive drum while scanning so as to form a latent image on the photoconductive layer;
   a developing means that forms a toner image on the surface of the photoconductor drum by adhering toner particles to portions where the latent image is firmed;
   a transfer means that is provided at a predetermined transfer position downstream from the developing means in a rotation direction of the photoconductor drum so as to face the surface of the photoconductor drum, and transfer the toner image to a recording paper sheet;
   a fixing means that fixes the toner image on the recording paper sheet by applying predetermined pressure and heat to the recording paper sheet;
   a paper feeding means to convey the recording paper sheet from a paper feed tray to an exit tray through the transfer means and the fixing means; and
   a control means to control the entire of the image forming apparatus, wherein
   the exposing means is a laser scan unit which is previously adjusted to have a predetermined quality when components thereof are assembled as a unit, the laser scan unit configured as a black box after being assembled with no adjustment;
   the laser scan unit comprises a laser diode that emits a laser beam, a collimator lens that collimates the laser beam emitted from the laser diode, a cylindrical lens that focuses the laser beam in a main scanning direction, a polygon mirror that reflects the laser beam focused in the main scanning direction by the cylindrical lens to scan in the main scanning direction, an fθ lens that corrects aberration of the laser beam reflected by the polygon mirror while the laser beam passes therethrough, a mirror that reflects the laser beam passes through the fθ lens toward the surface of the photoconductor drum, and a boxy housing made of resin molding into which the above mentioned elements are installed;

the housing of the laser scan unit is fixed on a frame of the image forming apparatus by screws at three fixing portions, two of which are provided in vicinities of both side faces of the housing and one of which is provided in a vicinity of a rear face of the housing;

each fixing portion has a pair of semicircular recesses formed on a top face and a bottom face of the housing and a first elongated hole which penetrates through the housing from the top face to the bottom face;

at least one adjuster which serves as a spacer to adjust inclination of the laser scan unit with respect to the frame in a vertical plane, wherein the at least one adjuster is attached to a corresponding one of the three fixing portions of the laser scan unit;

wherein the at least one adjuster is selected among a plurality kinds of adjusters which are respectively formed of metal plates having different thickness, and has a coupling portion which faces or contacts the rear face and the side faces of the housing of the laser scan unit, and a pair of engaging portions which are formed at both ends of the coupling portion to protrude in same direction and engage within the recesses of the corresponding fixing portion;

the engaging portions of the at least one adjuster have substantially same shape and dimensions of the recess but smaller by predetermined tolerances than that of the recess, and an inner dimension between the engaging portions of the at least one adjuster is substantially same dimension as but larger by a predetermined tolerance than a dimension between the recesses formed on the top face and the bottom face of the housing in each fixing portion;

a first elongated hole which penetrates through the housing from the top face to the bottom face is formed at each of the three fixing portions, and a second elongated hole having substantially same shape as the first elongate hole is formed at each of the engaging portions of the adjuster, so that the screw penetrates through the first and second elongated holes when the laser scan unit is mounted on the frame;

a depth of the recess is shallower than a smallest thickness of the metal plate of the at least one adjuster, so that the bottom face of the housing of the laser scan unit never contacts with the frame, and thereby enabling to prevent cracking of the housing even when the laser scan unit is mounted on the frame by the screws.

* * * * *